United States Patent
Cai

(10) Patent No.: US 10,798,173 B2
(45) Date of Patent: Oct. 6, 2020

(54) SYSTEM AND METHOD FOR FACILITATING A DATA EXCHANGE AMONGST COMMUNICATION DEVICES CONNECTED VIA ONE OR MORE COMMUNICATION NETWORKS

(71) Applicant: Voko Solutions Limited, Hong Kong (HK)

(72) Inventor: Qian Cai, Plano, TX (US)

(73) Assignee: Voko Solutions Limited, Hong Kong (HK)

( * ) Notice: Subject to any disclaimer, the term of this patent is extended or adjusted under 35 U.S.C. 154(b) by 350 days.

(21) Appl. No.: 15/680,324

(22) Filed: Aug. 18, 2017

(65) Prior Publication Data
US 2019/0058764 A1    Feb. 21, 2019

(51) Int. Cl.
| | |
|---|---|
| G06F 15/16 | (2006.01) |
| H04L 29/08 | (2006.01) |
| H04W 4/70 | (2018.01) |
| H04W 4/38 | (2018.01) |
| H04W 4/18 | (2009.01) |
| H04L 12/733 | (2013.01) |

(52) U.S. Cl.
CPC .............. *H04L 67/12* (2013.01); *H04L 67/32* (2013.01); *H04W 4/18* (2013.01); *H04W 4/38* (2018.02); *H04W 4/70* (2018.02); *H04L 45/122* (2013.01)

(58) Field of Classification Search
CPC ....... H04L 67/12; H04L 67/32; H04L 45/122; H04W 4/18; H04W 4/70; H04W 4/38
USPC ................... 709/204; 370/315, 389; 715/239
See application file for complete search history.

(56) References Cited

U.S. PATENT DOCUMENTS

| | | | | |
|---|---|---|---|---|
| 2004/0006704 A1* | 1/2004 | Dahlstrom | ............ | G06F 21/577 726/25 |
| 2005/0202385 A1* | 9/2005 | Coward | ............ | H04L 29/06027 434/307 R |
| 2009/0265251 A1* | 10/2009 | Dunlap | ................ | G06Q 10/087 705/26.1 |
| 2009/0304014 A1* | 12/2009 | Evans | ..................... | H04L 47/56 370/412 |
| 2010/0124219 A1* | 5/2010 | Brand | .................... | H04W 40/08 370/389 |
| 2010/0246473 A1* | 9/2010 | Brand | .................. | H04B 7/2606 370/315 |
| 2013/0198613 A1* | 8/2013 | Scoda | .................... | G06F 16/986 715/239 |
| 2016/0035012 A1* | 2/2016 | Abell | ................. | G06Q 30/0641 705/27.1 |

(Continued)

*Primary Examiner* — Thuong Nguyen

(57) ABSTRACT

The present subject matter discloses a system and a method for facilitating data exchange amongst communication devices connected via one or more communication networks. In accordance with the system and method, data may be received from one or more IoT devices of a plurality of IoT devices. The data may be associated with a first user. The data may be converted into normalized data, wherein the normalized data may comprise data of various formats. Based upon the normalized data, useful information may be extracted. The useful information may be matched with a first set of rules defined by a second user to obtain matched data. One or more products may be generated based on the matched data and a second set of rules defined by the first user. The one or more data products may be sent to the second user via a network.

13 Claims, 11 Drawing Sheets

(56) References Cited

U.S. PATENT DOCUMENTS

| | | | |
|---|---|---|---|
| 2017/0195267 A1* | 7/2017 | Ghafourifar | H04L 51/066 |
| 2017/0222999 A1* | 8/2017 | Banga | H04L 63/08 |
| 2017/0302361 A1* | 10/2017 | Lim | H04B 7/15585 |
| 2017/0359417 A1* | 12/2017 | Chen | H04L 67/12 |
| 2018/0034701 A1* | 2/2018 | Nagesh | H04L 47/20 |
| 2018/0218019 A1* | 8/2018 | Libow | H04L 12/2823 |
| 2018/0246944 A1* | 8/2018 | Yelisetti | G06F 16/258 |
| 2019/0058764 A1* | 2/2019 | Cai | H04L 67/12 |

* cited by examiner

SYSTEM AND METHOD FOR FACILITATING A DATA EXCHANGE AMONGST COMMUNICATION DEVICES CONNECTED VIA ONE OR MORE COMMUNICATION NETWORKS

TECHNICAL FIELD

The present application described herein, in general, relates to system and method for facilitating data exchange amongst communication devices connected via one or more communication networks.

BACKGROUND

The most important character of digital era is that anything is data driven and data is everywhere. Due to advancement in internet-enabled technologies, access to the data has been made electronically available to any person at any time and from any location. The data is transported on the internet not only as a communication media but it is also considered as a product. There are billions of sensors and devices on the internet. These devices are called Internet of Things (IoT) or Internet of Everything (IoE). The IoT devices are mostly used for monitoring of data. Each of the IoT devices are enabled to exchange data with users, enterprises and further amongst other IoT devices connected in a communication network. The deployment of large amount of IoT devices therefore results in generation of humongous amount of data. Further, another source of generation of such enormous data is the datasets generated via social networking platforms, enterprise-based applications, and state-owned websites and/or portals.

All of this data may be of high value, especially for deriving insights or business intelligence from such data originated from multitude of sources. For example, the data generated by IoT devices may be utilized to remotely monitor existing infrastructures (e.g. a building) via computing systems communicating with the IoT devices deployed within such existing infrastructures. In another example, the data generated by the social networking platforms may include deriving behavioral pattern of a consumer to recommend one or more commercial products to the consumer based upon the behavioral pattern in combination with consumer's demographic profile and other factors. Therefore, the data originated from these multitude source need to be transferred/exchanged with many of the entities such as users, enterprises, institutes, and corporates etc., who can derive valuable insights from the data. However, since the data is of huge volume, of different formats and susceptible to intruder attacks, there remains a challenge to provide a unified platform facilitating data aggregation, data management and data exchange in effective, efficient, accurate and secured manner.

SUMMARY

This summary is provided to introduce concepts related to systems and methods for facilitating data exchange amongst communication devices connected via one or more communication networks and the concepts are further described below in the detailed description. This summary is not intended to identify essential features of the claimed subject matter nor is it intended for use in determining or limiting the scope of the claimed subject matter.

In one implementation, a system for facilitating data exchange amongst communication devices connected via one or more communication networks is disclosed. The system may comprise a plurality of Internet of Things (IoT) devices, a processor and a memory coupled with the processor. The processor may be communicatively coupled with the plurality of IoT devices. The processor may be configured to execute instructions for receiving data from one or more IoT devices of the plurality of IoT devices, wherein the data is associated with a first user. The data may be received using at least one communication protocol. The processor may be configured to execute instructions for processing the data in order to convert the data into a normalized data. The normalized data may comprise data in various formats. The processor may be configured to execute instructions for extracting useful information from the normalized data. The processor may be configured to execute instructions for matching the useful information with a first set of rules defined by a second user to obtain matched data. Further, the processor may be configured to execute instructions for generating one or more data products based on the matched data and a second set of rules defined by the first user. The processor may be configured to execute instructions for storing the one or more data products into a product database of the memory. The processor may be configured to execute instructions for sending the one or more data products to the second user via a network.

In another implementation, a method for facilitating data exchange amongst communication devices connected via one or more communication networks is disclosed. In one aspect, the method may comprise receiving, via a processor, data from one or more IoT devices of the plurality of IoT devices, wherein the data is associated with a first user. The data may be received using at least one communication protocol. The method may comprise processing, via the processor, the data in order to convert the data into a normalized data. The normalized data may comprise data in various formats. The method may further comprise extracting, via the processor, useful information from the normalized data. The method may comprise matching, via the processor, the useful information with a first set of rules defined by a second user to obtain matched data. Further, the method may comprise generating, via the processor, one or more data products based on the matched data and a second set of rules defined by the first user. The method may comprise storing, via the processor, the one or more data products into a product database of the memory. Further, the method may comprise sending, via the processor, the one or more data products to the second user via a network.

In yet another implementation, a non-transitory computer readable medium storing program for facilitating data exchange amongst communication devices connected via one or more communication networks is disclosed. The program may comprise programmed instructions for receiving data from one or more IoT devices of the plurality of IoT devices, wherein the data is associated with a first user. The data may be received using at least one communication protocol. The program may further comprise programmed instructions for processing the data in order to convert the data into a normalized data. The normalized data may comprise data in various formats. The program may further comprise programmed instructions for for extracting useful information from the normalized data. The program may further comprise programmed instructions for matching the useful information with a first set of rules defined by a second user to obtain matched data. Further, the program may comprise programmed instructions for generating one or more data products based on the matched data and a second set of rules defined by the first user. Further, the program may comprise programmed instructions for storing the one or more data products into a product database of the memory. Furthermore, the program may comprise programmed instructions for sending the one or more data products to the second user via a network.

BRIEF DESCRIPTION OF THE DRAWINGS

The detailed description is described with reference to the accompanying figures.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
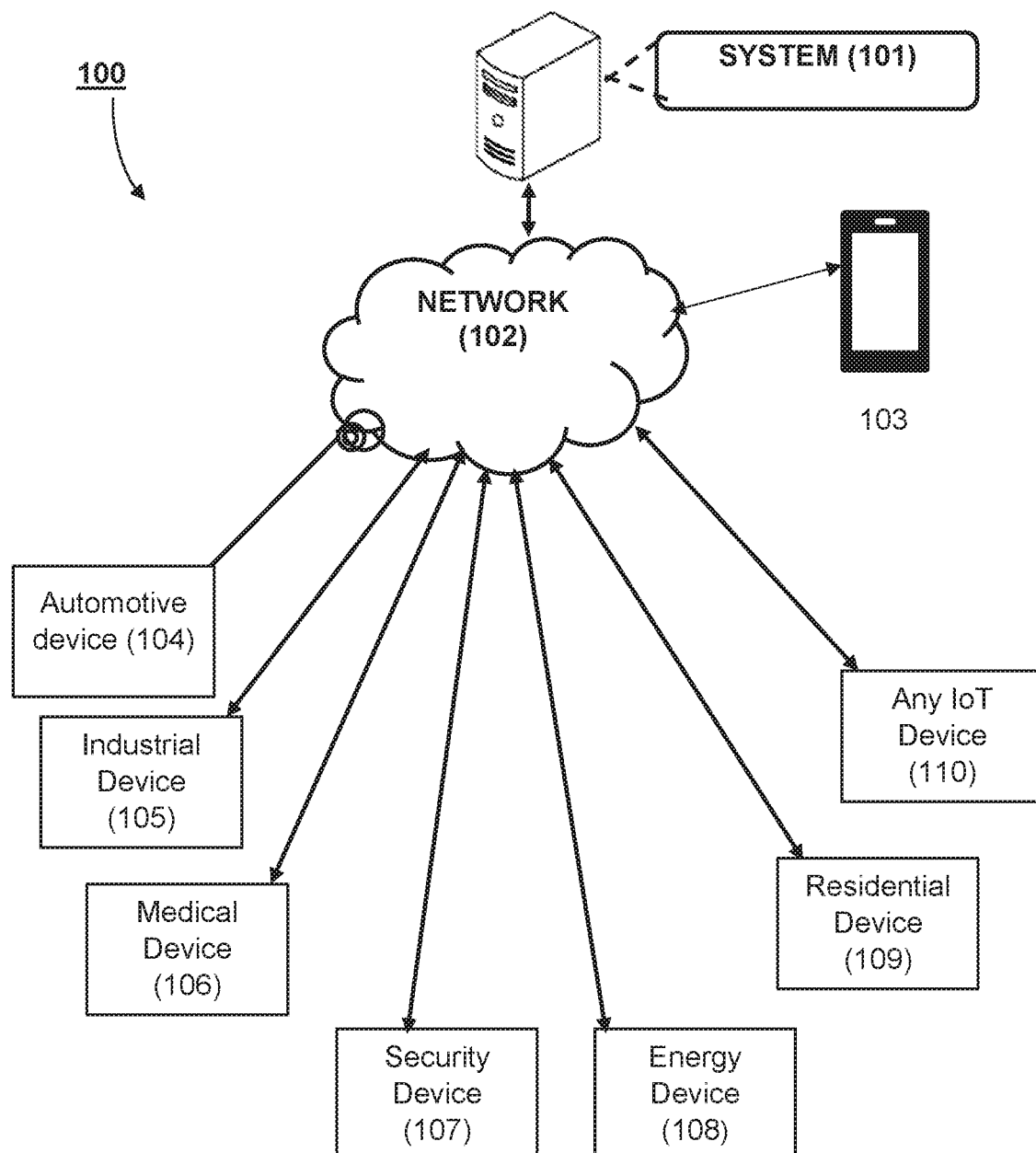
FIG. 1 illustrates an implementation 100 of a system 101 for facilitating data exchange amongst communication devices connected via one or more communication networks, in accordance with an embodiment of the present subject matter.

Referring to FIG. 1, a network implementation 100 of a system 101 for facilitating data exchange amongst communication devices connected via one or more communication networks is illustrated, in accordance with an embodiment of the present subject matter. As shown, the system 101 is communicatively coupled with a plurality of IoT devices and a user device 103. The system 101 may comprise a processor and a memory wherein the memory coupled with the processor. The user device 103 may belong to a first user or a second user. In one embodiment, the plurality of IoT devices may be connected to the system 101 via a network 102. In one embodiment, the system 101 may comprise at least two or more user interfaces. In one embodiment, the system 101 may be a combination of Java Server Pages (JSP) and Struts framework which is configured to support Application Development Framework (ADF). In one embodiment, the system 101 may comprise a plurality of functional modules wherein the plurality of functional modules may be stored in the memory.

In one embodiment, the plurality of Internet of Things (IoT) devices may be configured to act as data source points. It must be noted to one skilled in the art, an Internet of Things (IoT) is defined as any object on the internet that can produce data and communicate with another object on the internet. The IoT is also called as Internet of Everything (IoE) or Machine-to-Machine (M2M). In one embodiment, the plurality of IoT devices may include, but not limited to, an automotive device 104, an industrial device 105, a medical device 106, a security device 107, an energy device 108, a residential device 109 and any other IoT device 110. In one embodiment, at least one IoT device of the plurality of IoT devices may be classified into a class of a plurality of predefined classes based upon hardware configuration of the said at least one IoT device. In one exemplary embodiment, at least one IoT device of the plurality of IoT device may be classified into one of the three classes comprising of class 0, class 1 and class 2. In one exemplary embodiment, an IoT device categorized into class 0 may have the hardware configuration of RAM storage capacity <1 kB and flash memory <100 kB. The IoT device categorized into class 0 may be configured to use gateway for establishing communication with other IoT device or any other networking device. Further, in this exemplary embodiment, an IoT device categorized into class 1 may have the hardware configuration of RAM storage capacity ~10 kB and flash memory ~100 kB. The IoT device categorized into class 1 may be configured to use protocol stack as per the selection of IoT device using CoAP. In one embodiment, the IoT devices categorized into class 1 may be configured to interact with other devices without the gateway. Furthermore, in this exemplary embodiment, an IoT device categorized into class 2 may have the hardware configuration of RAM storage capacity ~50 kB and flash memory ~250 kB. The IoT device categorized into class 2 may be configured to support IPv4 and IPv6 protocol. In one embodiment, class 2 devices may be configured to interact with the other network devices. In one embodiment, the plurality of IoT devices may be a residential home (smart home) or a commercial building. In one embodiment, the plurality of IoT devices may be either internet capable or non-internet capable IoT devices. In one embodiment, internet capable IoT devices may connect to the internet in order to transfer data to the plurality of functional modules. In another embodiment, the non-internet capable IoT devices may connect to the local network with non-internet protocol like Bluetooth, customized TCP/IP protocol, etc. In one embodiment, the non-internet capable IoT devices may use a local gateway in order to access the internet which may further transfer data to the plurality of functional modules. In one embodiment, the plurality of IoT devices are communicatively coupled to the plurality of functional modules through a network 102.

In one implementation, the network 102 may be a wireless network, a wired network or a combination thereof. The network can be implemented as one of the different types of networks, cellular communication network, local area network (LAN), wide area network (WAN), 802.15 Personal Area Network PAN, 802.11 LAN, 802.16 Metropolitan Area Network MAN and 802.20 WAN, the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network may include a variety of network devices, including routers, bridges, servers, computing devices, storage devices, and the like.

In one embodiment, the system 101 may receive data from the plurality of IoTs through MQTT protocol. In one embodiment, the first user may be owner of the data. In another embodiment, the first user may be seller of the data. The owner and/or seller of the data may be an individual or a corporate entity. In one embodiment, the system 101 may process the data in order to convert the data into a normalized data. In one embodiment, the normalized data comprises data in various formats. In one embodiment, the normalized data may be stored in the memory.

In one embodiment, the system 101 may receive a second set of rules defined by the first user (i.e. data owner) through XMPP protocol. In one embodiment, the memory may store the second set of rules. In one exemplary embodiment, the second set of rules may comprise one or more rules configured to categorize the data, define data delivery methods, define product catalogue, define product price schedule, define product copyright terms, and finally publish the product on data. In one embodiment, the system 101 may generate one or more data products based on the normalized data and the second set of rules defined by the first user. In one embodiment, the memory may store the one or more data products. In one embodiment, the system 101 may receive a first set of rules defined by a second user through XMPP protocol. In one embodiment, the memory may store the first set of rules defined by the second user. In one embodiment, the first set of rules defined by the second user may comprise one or more rules configured to define data delivery network channel interfaces, select a data product, a payment method and complete transaction of the data product. In one embodiment, the system 101 may be configured to send the one or more data products stored in the memory to the second user based on the first set of rules defined by the second user.

In one exemplary embodiment, the first user may define the second set of rules for industry or professional domains including, but not limited to, a medical industry, a manufacturing industry, an insurance industry in order to categorize the data. In one exemplary embodiment, a heartbeat monitoring IoT device associated with the first user may collect the heart beat data of an individual. In this exemplary embodiment, the heart beat data collected may be uploaded to the system 101 using XMPP protocol. The heart beat data may be converted in to the normalized heart beat data using one or more functional modules of plurality of functional modules of the system 101. In this exemplary embodiment, the normalized heart beat data may be stored in a raw data database of the memory of the system 101. In this exemplary embodiment, the normalized heart beat data may be further processed using one or more functional modules of the plurality of functional modules and store in the product data database of the memory. In this exemplary embodiment, the first user may categorize the data into medical industry and generate a data product corresponding to the heart beat data using the second set of rules. In this exemplary embodiment, the product data database of the memory may store the heart beat data product. In this exemplary embodiment, the second user may use first set of rules which comprises subscription of medical industry and more specifically the heart beat data. In one embodiment, the memory of the system 101 may store the first set of rules. The system 101 may send the heart beat data product stored in the product data database to the second user after matching the first set of rules stored in the memory. In this exemplary embodiment, the system 101 may send the heart beat data product to the second user as per the first set the rules for subscription of heart beat data.

Figure 2:
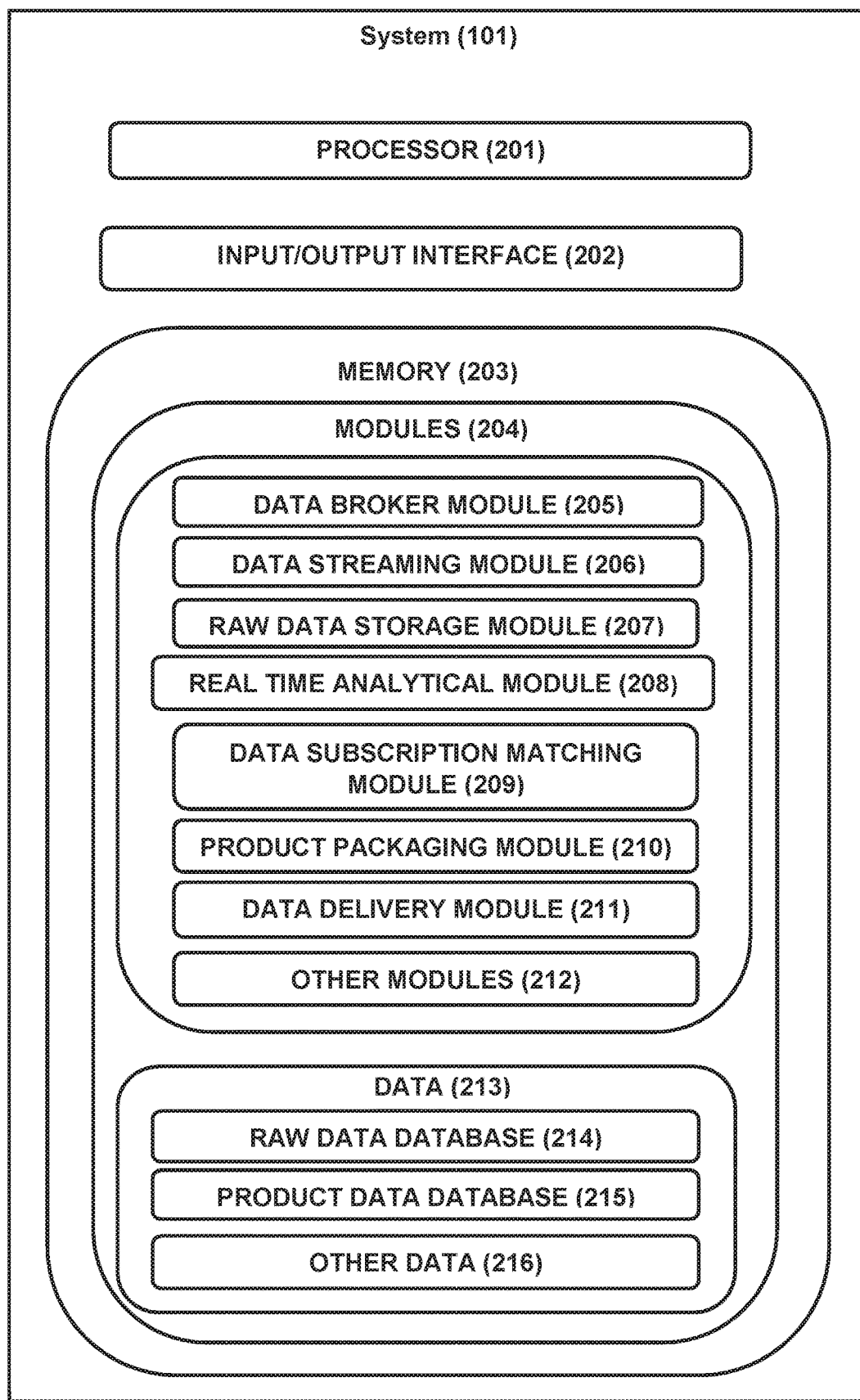
FIG. 2 illustrates components of the system 100, in accordance with an embodiment of the present subject matter.

Now, referring to FIG. 2, a system 200 for facilitating data exchange amongst communication devices connected via one or more communication networks, in accordance with the embodiment of the present subject matter is illustrated. In one embodiment, the system 101 may comprise a processor 201, an input/output (I/O) interface 202, and a memory 203. The processor 201 may be implemented as one or more microprocessors, microcomputers, microcontrollers, digital signal processors, central processing units, state machines, logic circuitries, and/or any devices that manipulate signals based on operational instructions. Among other capabilities, the processor 201 is configured to fetch and execute computer-readable/programmed instructions stored in the memory 203.

The I/O interface 202 may include a variety of software and hardware interfaces, for example, a web interface, a graphical user interface, and the like. The I/O interface 202 may allow the system to interact with a user directly or through the user devices. Further, the I/O interface 203 may enable the system to communicate with other computing devices, such as web servers and external data servers (not shown). The I/O interface 202 can facilitate multiple communications within a wide variety of networks and protocol types, including wired networks, for example, LAN, cable, etc., and wireless networks, such as WLAN, cellular, or satellite. The I/O interface 202 may include one or more ports for connecting a number of devices to one another or to another server.

The memory 203 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and memory cards. The memory 203 may include modules 204 and data 213.

In one embodiment, the modules 204 include routines, programs, objects, components, data structures, etc., which perform particular tasks, functions or implement particular abstract data types. In one implementation, the modules 204 may include a data broker module 205, a data streaming module 206, a raw data storage module 207, a real time analytical module 208, data subscription matching module 209, a product packaging module 210, a data delivery module 211 and other modules 212. In one embodiment, other modules 212 may comprises a data collection module, a data analytics module, a data categorization module, a data product conversion module, a product listing module, a product search module, a product purchase module, a payment module, a data delivery module and a second user data receive gateway module.

The data 213, amongst other things, serves as a repository for storing data processed, received, and generated by one or more of the modules 204. The data 213 may also include a raw data database 214, a product data database 215 and other data 216. The raw database 214 and the product database may be in form of NoSQL database Cassandra or MySQL database. The other data 216 may include data generated as a result of the execution of one or more modules in the other modules 213.

Figure 3A:
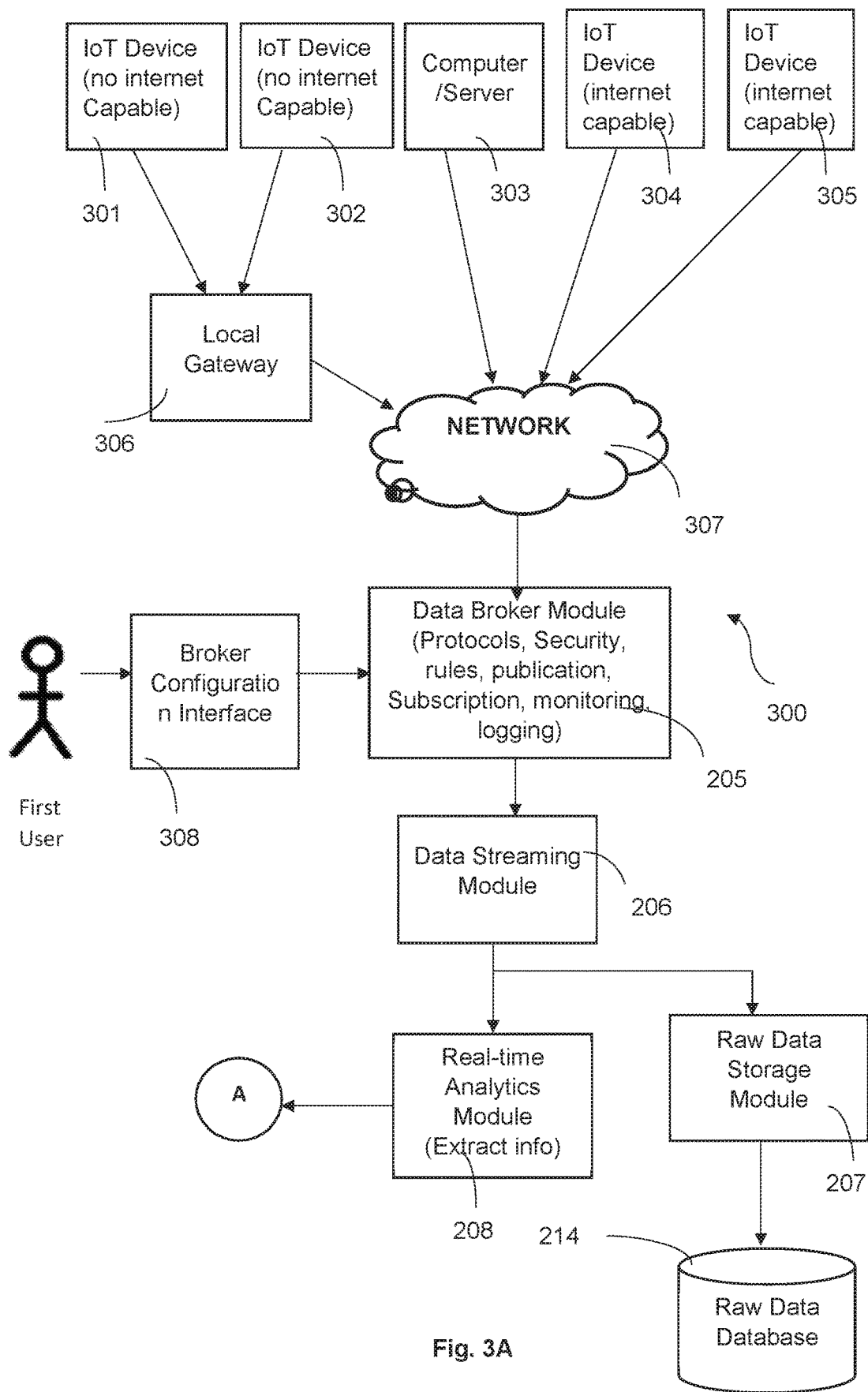
FIG. 3A-3B illustrates a work flow implemented by the system 101 for facilitating data exchange amongst communication devices connected via one or more communication networks, in accordance with an embodiment of the present subject matter.
Figure 3B:
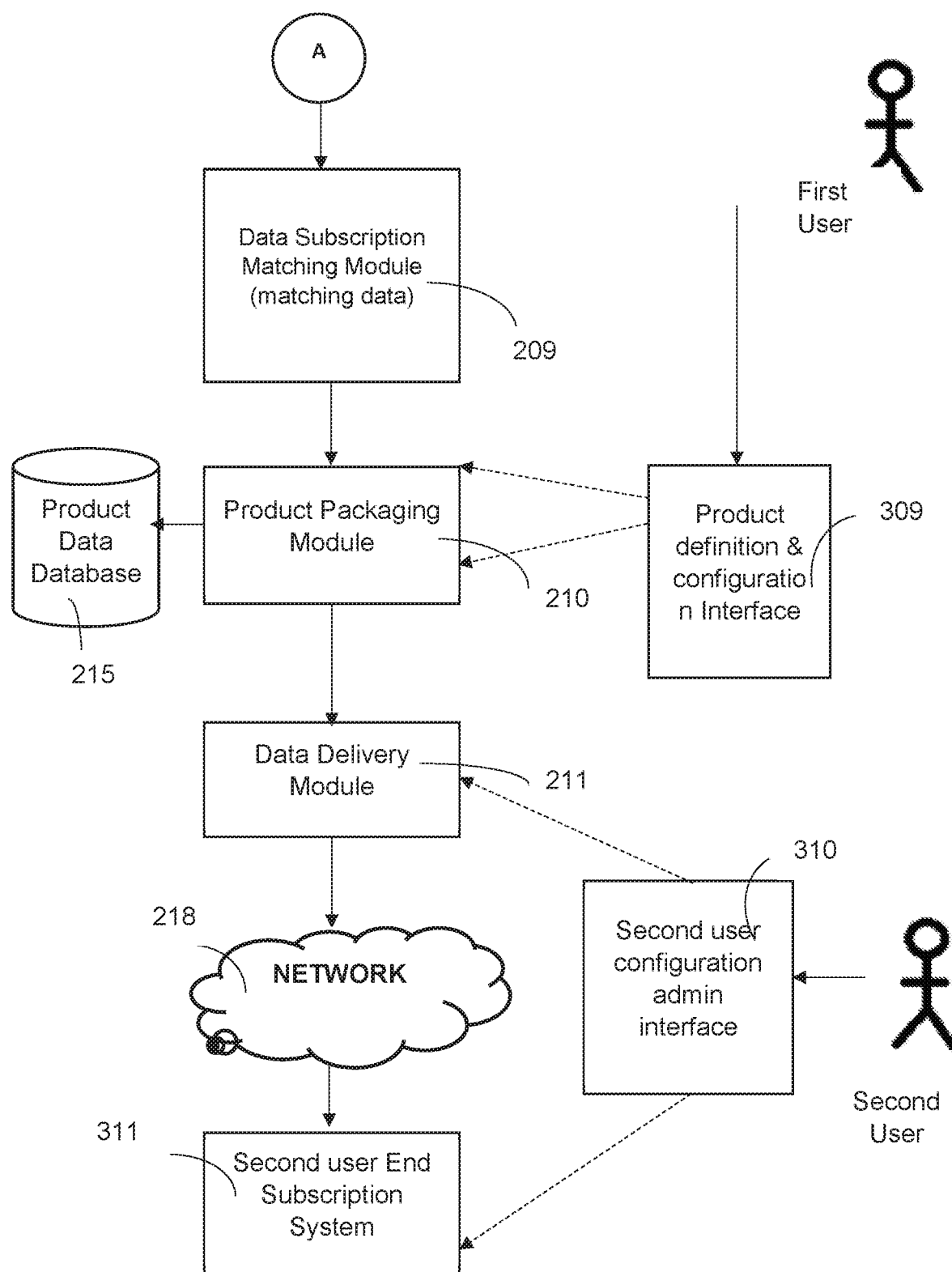

Now referring to FIG. 3A-3B, work flow 300 implemented by the system 101 for facilitating data exchange amongst communication devices connected via one or more communication networks is illustrated, in accordance with an embodiment of the present subject matter. In one embodiment, the system 101 may be configured to collect the data from at least one IoT device of the plurality of IoT devices wherein the data may be associated with the first user. In one embodiment, the first user may be an owner of the data. In another embodiment, the first user may be seller of the data. In one embodiment, the data may be stored on the computer/server/smart phone 303. The data may be uploaded directly from network 307. In one embodiment, the plurality of IoT devices may be either internet capable or non-internet capable IoT devices. In one embodiment, the internet capable IoT devices (304,305) and a computer/server 303 may connect to the internet in order to transfer data to the processor 201. In one embodiment, the non-internet capable IoT devices (301,302) may connect to the local network with non-internet protocol like Bluetooth, customized TCP/IP protocol, etc. In one embodiment, the non-internet capable IoT devices (301, 302) may use a local gateway in order to access internet which may further transfer data to the processor 202 (shown in FIG. 2). In one embodiment, the plurality of IoT devices are communicatively coupled to the different functional modules of stored in the memory through a network 307.

In one implementation, the network 307 may be a wireless network, a wired network or a combination thereof. The network can be implemented as one of the different types of networks, cellular communication network, local area network (LAN), wide area network (WAN), 802.15 Personal Area Network PAN, 802.11 LAN, 802.16 Metropolitan Area Network MAN and 802.20 WAN, the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 307 may include a variety of network devices, including routers, bridges, servers, computing devices, storage devices, and the like.

In one embodiment, the IoT device may be configured to transmit data to the processor 201 (shown in FIG. 2) through one of communication means selected from a group consisting of a barcode scanner, powerline, Ethernet, RFID, ANT, NFC, 6LoWPAN, ZIGBEE, Z-WAVE, UWB, Bluetooth, Wi-Fi, DASH7, License-free spectrum radio, WiMAX, Weightless, 2G/GSM/EDGE CDMA, EVDO, 1G, GPS/GPRS, and Cellular 4G/LTE. In one example, an IoT device in form of a wearable wrist band may hear beat data collected from an individual and transmit the heart beat data collected to the mobile phone device. In another example, a room temperature collected by another IoT device in form of a smart thermostat on the wall may be transmitted to a computer via Wi-Fi network.

In one embodiment, the data Broker module 205 (shown in FIG. 2) may be configured to receive the data from the at least one IoT device of the plurality of IoT devices. In one embodiment, the data broker module 205 may be configured to receive the data using a plurality of communication communication protocols selected from a group consisting of IPv4, IPv6, UDP, DTLS, RPL, Telnet, MQTT, DDS, CoAP, XMPP, HTTP, sockets, REST APIs. MQTT and XMPP. In one embodiment, the plurality of communication protocols may enable different electronic or IoT devices to communicate with each other. Further, the data broker module 205 may be configured to perform functions like data publishing, subscription, logging and monitoring. In one exemplary embodiment, a wearable device may collect data of body temperature of a user and use MQTT or XMPP protocol to transfer the body temperature data collected to the processor 201. In one embodiment, an MQTT protocol may be used for transmitting only temperature data to the processor 201. In one embodiment, the XMPP may an allow transmission of structured data. In one exemplary embodiment, the XMPP protocol may be used for transmitting combination of temperature data with profile data including gender, age, location and the like.

In one exemplary embodiment, the data broker module 205 may provide security rules and policies to protect the data communication between the first user and the second user. In one embodiment, the second user may be a subscriber of the data. In one embodiment, the data broker module 205 may be configured to publish messages, when the first user defines the second set rules for selling, listing the data. In one embodiment, the data broker module 205 may be configured to notify the second user when the second user set the first set of rules for subscription of data. The data broker module 205 may provide logging system which may enable admin team to perform troubleshooting and to determine root cause of the problem if some problem occurs.

In one embodiment, the first user may use a broker configuration interface 308 in order to configure the functions of the data broker module 205. In one exemplary embodiment, the first user may operate or configure the functions of the data broker module 205 through the user device such as smart phone, computer but not limited to such devices. In one embodiment, the first user may be owner of the data. Further, the data broker module 205 may be configured to transfer data to the data streaming module 206 in order to process the data.

In one embodiment, the data streaming module 206 may be configured to convert the data into the normalized data. In one embodiment, the data may be transformed, combined, and split into various formats. In one embodiment, the normalized data may be formatted as per logical, business, or grouping requirement. In one embodiment, the data collected from the various sources may be unstructured, unformatted and unorganized and hence considered as a raw data. In one embodiment, the raw data may be processed in order to make the data more meaningful to the business. The processing of the data includes splitting the data, regroup the data logically, and formatting the data as per the requirement. In one exemplary embodiment, a data collected from a hospital patient monitoring device may be unorganized data. In one embodiment, the data streaming module 206 may receive the raw data, the data may be processed first according to various health business group types set by the first user. Further, the data streaming module 206 may be configured to transmit the normalized data to the real-time analytics module 208. In one embodiment, the data streaming module 206 may be configured to transmit the normalized data to the raw data storage module 207. In one embodiment, the raw data storage module 207 may be configured to store the normalized data in the raw data database 214.

In one embodiment, the real-time analytics module 208 may be configured to extract useful information from the normalized data. In one embodiment, the real-time analytics module 208 may include steps to call the data subscription matching module 209 to match useful information with the first of rules defined by the second user. In one embodiment, the second user may be a subscriber of the data. In one embodiment, the second user may use the user device such as smart phone, computer, tablet and the like for configuring/defining the rules. In one exemplary embodiment, IoT devices of the consumer cars may be configured to send the daily driving routes data to the processor 201. In one embodiment, business rules defined by the second user may be applied to extract drivers daily travel distance from the records. In another embodiment, the individual driver records may be combined into a group according the city names in order to get city wise traffic information.

Figure 5:
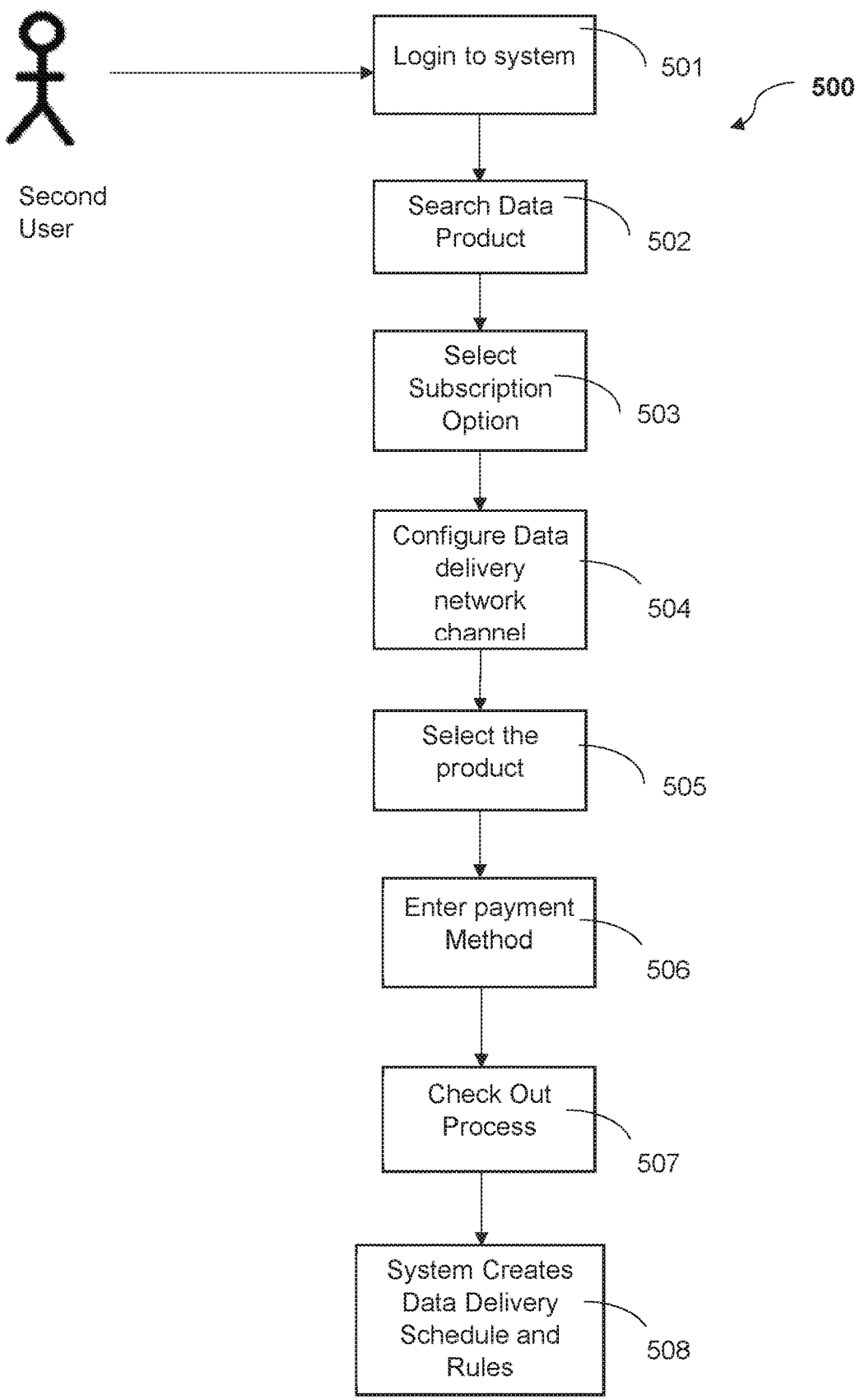
FIG. 5 illustrates a work flow 500 to define matching rules and schedules through a user device of a second user (i.e. a data subscriber), in accordance with an embodiment of the present subject matter.

Now referring FIG. 5, a work flow 500 to define matching rules and schedules through a user device of a second user (i.e. a data subscriber) is illustrated, in accordance with an embodiment of the present subject matter. In one embodiment, the second user may define the first set of rules. In one embodiment, the first set of rules may be configured to define data delivery network channel interfaces, select data product, a payment method and completing a transaction associated with the data product selected. The second user may search, subscribe and purchase one or more data product. At step 501, the second user may first login to the system 101. At step 502, the second user may search a data product. At step 503, the second user may select a subscription options. At step 504, the second user may configure a data delivery network channel. At step 505, the second user may select a product. At step 506, the second user may enter a payment method. At step 507, the second user may complete check out process (i.e. complete a transaction). At step 508, after the checkout process is completed, the system 101 may create the data delivery schedule and rules. In one embodiment, the rules and schedule may be used by the data subscription matching module 209 for configuring the first set of rules as defined by the second user.

Now referring to FIG. 2, the data subscription matching module 209 may transfer a matched data which is obtained by matching the useful information with the first set of rules defined by the second user to the product packaging module 210. In one embodiment, the product packaging module 210 may enable the first user to define the product using a second set of rules. In one embodiment, the second set of rules may comprise one or more rules configured to categorize the data, define data delivery methods, define product catalogue, define product price schedule, define product copyright terms, and publish the product on data.

Figure 4:
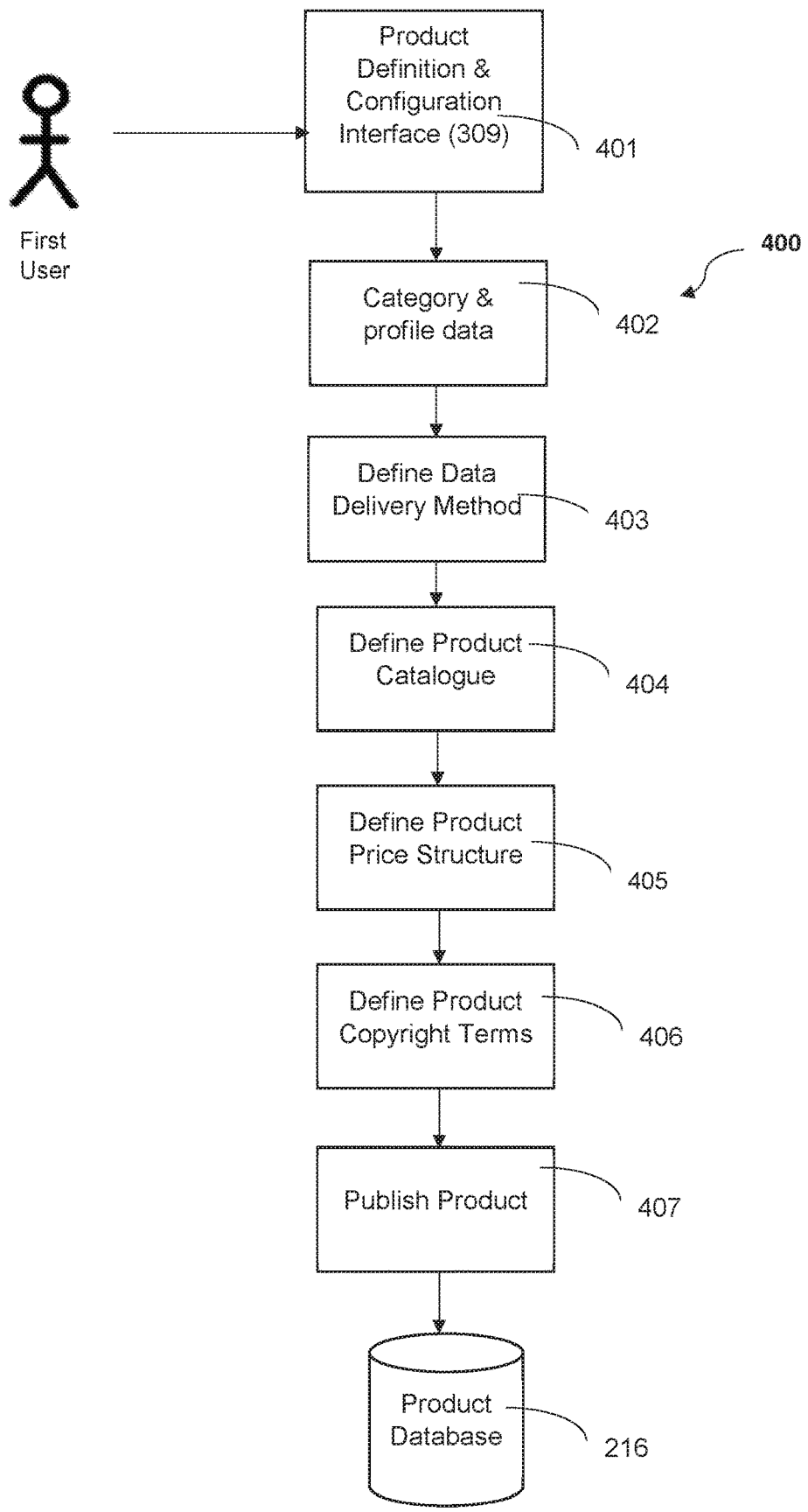
FIG. 4 illustrates a work flow 400 to define the data product through the user device of a first user (i.e. data owner), in accordance with an embodiment of the present subject matter.

Now referring to FIG. 4, a work flow 400 to define the data product through the user device of a first user (i.e. data owner) is illustrated in accordance with an embodiment of the present subject matter. At step 401, the first user may use the product definition & configuration interface 309 to define products. In one exemplary embodiment, the product definition & configuration interface 309 may be a GUI web page which is accessed from a web browser or a mobile phone. The GUI interface is configured to manage first user's data product. At step 402, the first user may categorize data and create a profile for data. In one exemplary embodiment, the first user may categorize the products into categories including, but not limited to, medical, health or transportation data types, and the like. At step 403, the first user may define data delivery methods. At step 404, the first user may define a product catalogue. At step 405, the first user may define product prices structure. At step 406, the first user may define product copyright terms. At step 407, the first user may publish product to the system 101. In one embodiment, the product definition configuration & configuration interface may enable the product packaging module 211 to generate one or more data product in real-time wherein the one or more data products may be stored in the product data database 215.

In one exemplary embodiment, the data may be categorized into health, medical, transportation, images, entertainment, and the like as per the second set of rules defined by the first user. The data belongs to different category may use different transportation in order to deliver data from the first user to the second user. In one embodiment, an encryption may be provided with some data types. In one embodiment, some data types may use FTP for batch download or P2P (peer to peer) transfer, etc. In one embodiment, a product catalogue may be a group of products that are offered by the first user. In one embodiment, the first user may be owner of data. In one embodiment, different first users may offer different products for sale. In one exemplary embodiment, a commercial company usually has large volume of data to be transferred and/or sold to other users/subscribers. In one exemplary embodiment, a company may have medical insurance data catalogue and a life insurance data catalogue. The medical insurance data may be categorized into young age group data, senior age group data, female data, etc. The different data set may have different price structure, for example people data with age and gender information may have higher price. The price structure may be based on age, gender, locations, work environment, etc. The product may be digital and downloadable which makes ownership verification more difficult. A series of copyright production and authentication methods may be developed to validate the ownership of original data.

In one embodiment, the data delivery module 211 may connect to the network 218 when the data product is ready and send the one or more data products to the second user end subscription system 311 through one of communication means selected from a group consisting of a barcode scanner, powerline, Ethernet, RFID, ANT, NFC, 6LoWPAN, ZIGBEE, Z-WAVE, UWB, Bluetooth, Wi-Fi, DASH7, License-free spectrum radio, WiMAX, Weightless, 2G/GSM/EDGE CDMA, EVDO, 1G, GPS/GPRS, and Cellular 4G/LTE.

In one embodiment, the system 101 may be configured to reduce delay of multiple hops between the plurality of IoT devices and the processor. In one embodiment, an allocation of processor to process the data received from at least one IoT device of the plurality of the IoT devices and data received from the first user and second user is done by the mathematical equation. The multi-hop end-to-end communication delay on wireless network is described by Raja Vara Prasad Yerra et. al in a research paper "Effect of Relay Nodes on End-to-end Delay in Multi-hop Wireless Ad-hoc Networks", incorporated herein by a reference. The measurement of delay of multiple hops between at least one IoT device of the plurality of IoT devices and the processor is calculated using following mathematical equation:

$$E[d_c] = \frac{e^{-\Lambda \pi f^2}}{p}\left[e^{\frac{\Lambda * f^2}{1 - \frac{p\lambda D}{r}}} - 1\right]$$

$$f = (1 + \Delta)r$$

The measurement parameters in the above equation include a transmission radius (r), a channel access probability (p), a node density (Λ) and a percentage of silent relay nodes (α). In one exemplary embodiment, at least one IoT device may be a car IoT device which is configured to transport the road condition data to the government transportation office. In this exemplary embodiment, the communication may be busy during high traffic conditions. In this exemplary embodiment, a data communication delay may be the data communication delay between a car IoT device. In this exemplary embodiment, the transmission radius (r) is between two car IoT devices or between a car IoT device and communication tower. In this exemplary embodiment, the channel probability (p) is number of communication towers in the area and potential Wi-Fi network is available. In this exemplary embodiment, the node density (Δ) is number of hops of the car IoT device from one communication tower to other communication tower or number of cell phone towers in the area. In this exemplary embodiment, the percentage of silent relay nodes (α) may address the delay.

Figure 6:
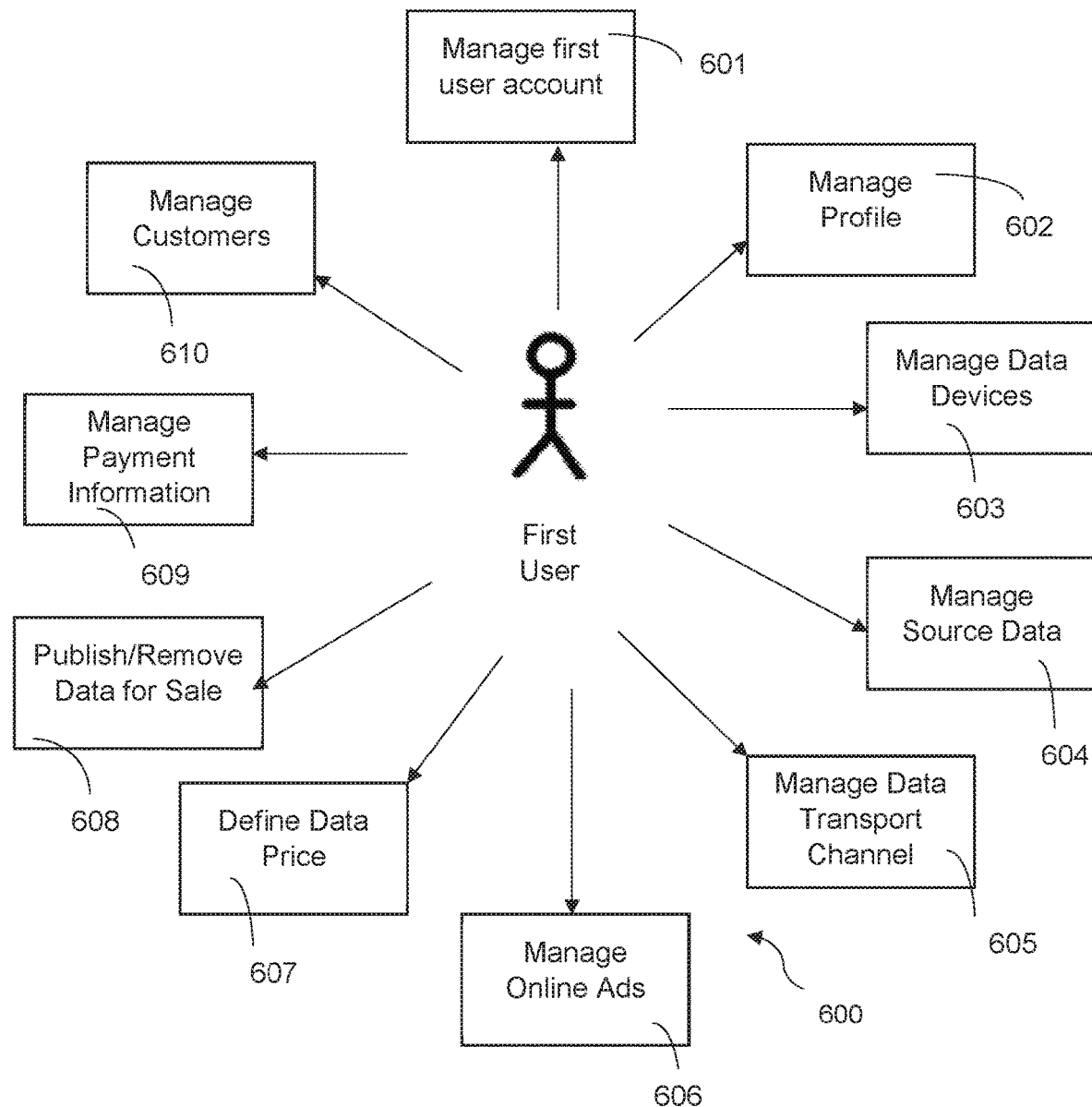
FIG. 6 illustrates a plurality of activities performed by the first user 600 on the system 101, in accordance with an embodiment of the present subject matter.

Now referring to FIG. 6, a plurality of activities performed by the first user 600 on the system 101 is illustrated, in accordance with an embodiment of the present subject matter. In this embodiment, the first user may perform the activities including, but not limited to, managing the first user account 601, managing account profile 602, managing end point data devices 603, managing source data 604, managing data transport channels 605, managing online advertisements 606, defining data price 607, publishing/removing data for sale 608, managing payment information 609 and managing customers 610. In one embodiment, the first user may perform these activities through a GUI interface on a smart phone, a computer or a tablet, and the like.

Figure 7:
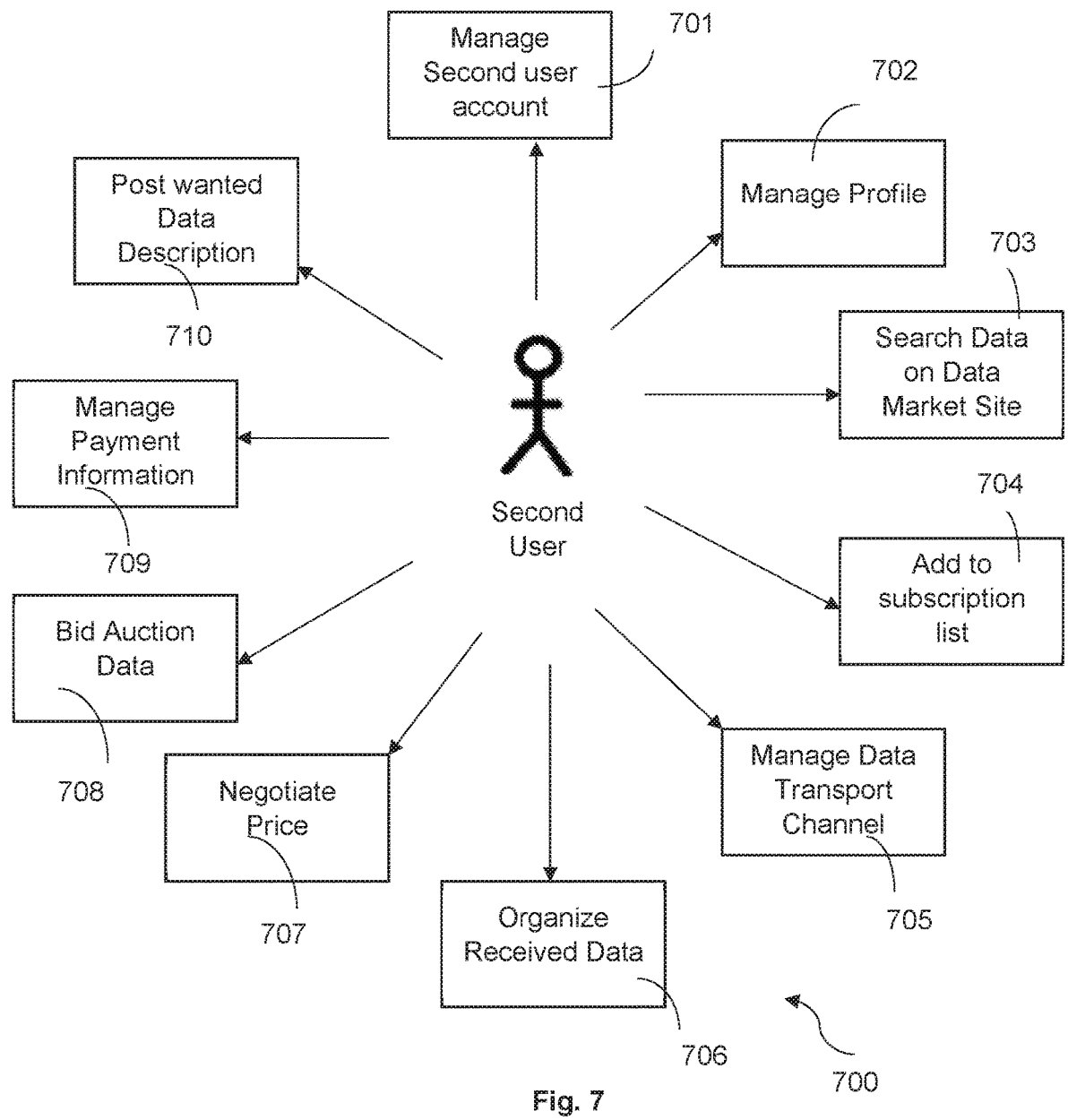
FIG. 7 illustrates a plurality of activities performed by the second user 700 on the system 101, in accordance with an embodiment of the present subject matter.

Now referring to FIG. 7, a plurality of activities performed by the second user 700 on the system 101 is illustrated, in accordance with an embodiment of the present subject matter. In one exemplary embodiment, the second user may perform the activities including, but not limited to, managing account 701, managing the second users profile 702, searching data on platform 703, adding data to subscription list 704, managing data transport channel 705, organizing received data 706, negotiating price with seller 707, bidding action data 708, managing payment information 709 and posting wanted data request online 710. In one embodiment, the second user may perform these activities through a GUI interface on a smart phone, a computer or a tablet, and the like.

Figure 8:
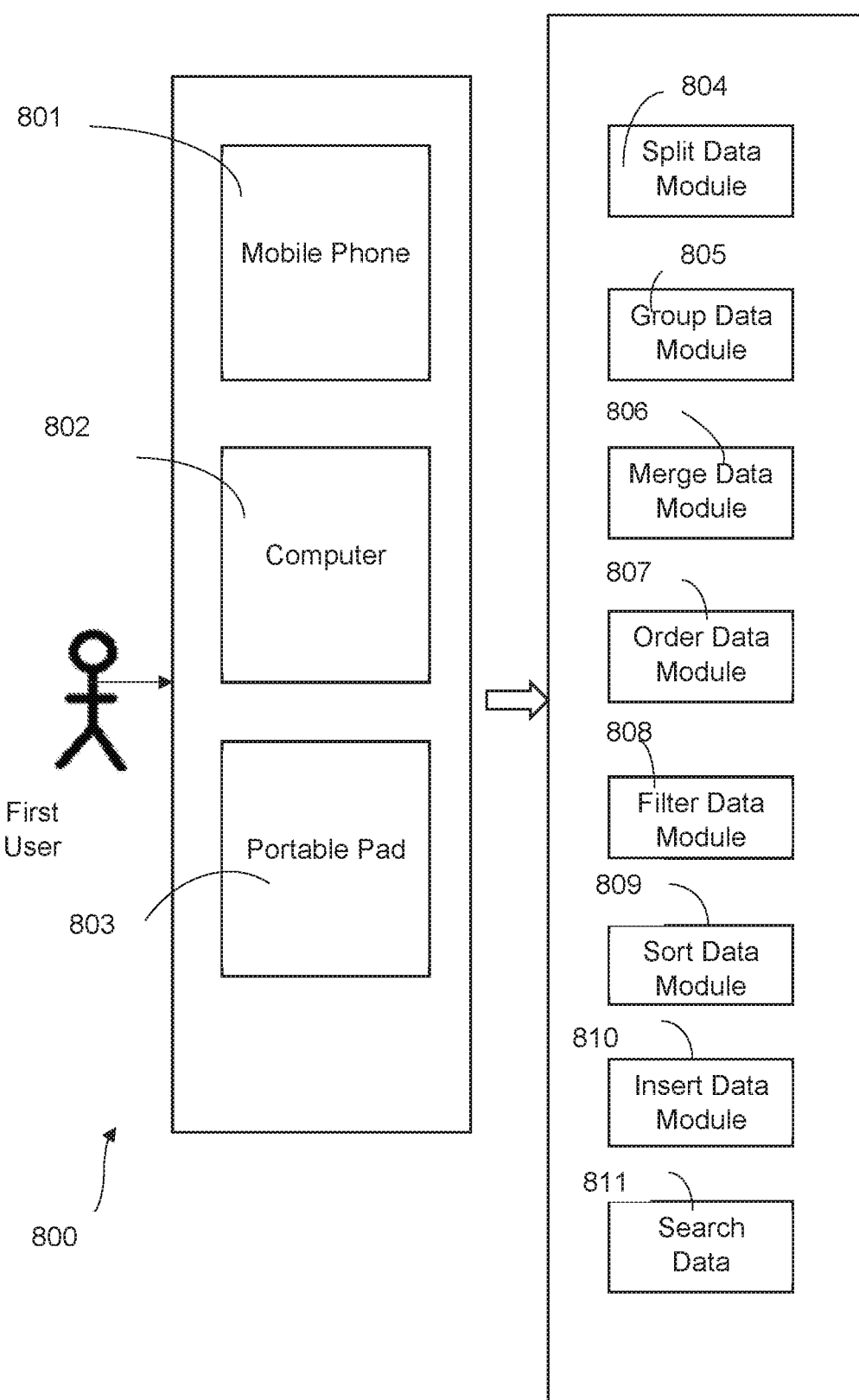
FIG. 8 illustrates data management operations functions 800 enabled by the system 101 for the first user, in accordance with an embodiment of the present subject matter.

Now referring to FIG. 8, data management operations functions 800 enabled by the system 101 for the first user is illustrated, in accordance with the embodiment of the present subject matter. The first user may manage data from a GUI interface provided by the system. The GUI may be run on the end user devices like a smart phone 801, or a computer 802 or a portable pad device 803. In one embodiment, the first user may manage the data using a split data module 804, a group data module 805, a merge data module 806, an order data module 807, a filter data module 808, a sort data module 809, an insert data module 810 and search data module 811. In one embodiment, the split data module 804 may enable the first user to separate the data or to perform splitting of data. In one embodiment, the merge data module 806 may enable the first user to merge the data. The group data module 805 may enable the first user to group the data. The filter data module 808 may enable the first user to filter data according to specific category and to remove part of data sets. The sort data module 809 may enable the first user to sort the list. The insert data module 810 may enable the first user to add the missed data sets into the stored data. The search data 811 may enable the first user to find the data in which the first user interested.

Figure 9:
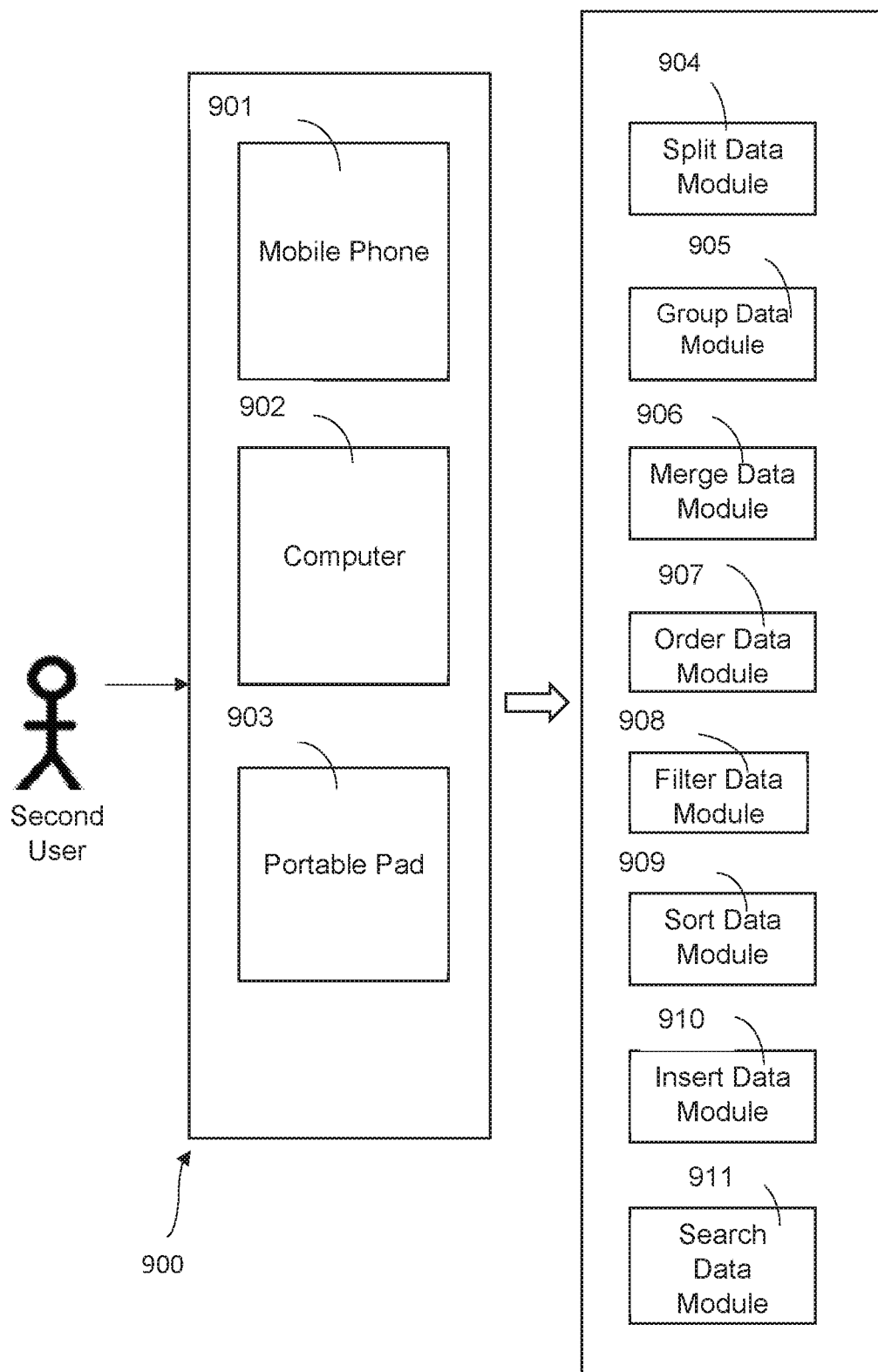
FIG. 9 illustrates data management operations functions 900 enabled by the system 101 for the second user, in accordance with an embodiment of the present subject matter.

Now referring to FIG. 9, data management operations functions 900 enabled by the system 101 for the second user is illustrated, in accordance with an embodiment of the present subject matter. The second user may manage data from a GUI interface provided by the system. The GUI may be executed on the end user devices like a smart phone 901, or a computer 902 or a portable pad device 903. In one embodiment, the second user may manage data using a split data module 904, a group data module 905, a merge data module 906, an order data module 907, a filter data module 908, a sort data module 909, an insert data module 910 and a search data module 911. In one embodiment, the split data module 904 may enable the second user to separate the data or to perform splitting of data. In one embodiment, the merge data module 906 may enable the second user to merge the data. The group data module 805 may enable the second user to group the data. The filter data module 908 may enable the second user to filter data according to specific category and to remove part of data sets. The sort data module 909 may enable the second user to sort the list. The insert data module 910 may enable the second user to add the missed data sets into the stored data. The search data 911 may enable the second user to find the data in which the second user interested.

In one exemplary embodiment, a hospital may own some medical records that which can sell to the insurance companies, but Health Insurance Portability and Accountability Act of 1996 (HIPPA) policy or law protects some patient data records from being sold, that means those data records must be removed before hospital can put on the market. The hospital data owner may use split data module to separate the data records and use filter module to remove part of data sets. In one embodiment, some records may be from different hospital systems, the hospital data owner may merge two systems record to form a single data set for sale. The hospital data owner may to use merge module to merge and then group module to group them. Suppose, the second user which is buyer is an insurance company who wants the list of data from hospital owner ordered by age values, in this case the hospital data owner may use sort function to sort the list. After a bulk size of data is organized, the hospital data owner may find a small set of data which is missed. The hospital data owner may use insert data module to add this sets to the big data group. The hospital data owner and data subscriber may use search data module to find the records that they have interests on.

In accordance with some embodiments of the present disclosure, the present system 101 in form of a data analytics platform may be used by a company to execute Big Data analytics. The collected data by the data analytics platform may enable deriving valuable insights and thereby generating a report. The report generated may be sold to interested buyers/stakeholders thereby providing a source of revenue/income for the owner of Big Data. In one embodiment, the data analytics platform may implement Hadoop framework for performing Big Data analysis. The software components in the Big data analysis include Ambari®, Cassandra®, Flume®, HBase®, HCatalog®, Hive®, Oozie®, Pig®, Solr®, Spark®, Swop® and Zookeeper®. The Big Data engine creates connections for transferring, storing or analyzing big data such as Sqoop®, MongoDB® and Big-Query®. A person skilled in the art would appreciate and realize that the Big Data Analysis and Processing using the Hadoop Framework and these software components is known in the art and hence the details of these software components and the Hadoop framework are not described in detail.

Figure 10:
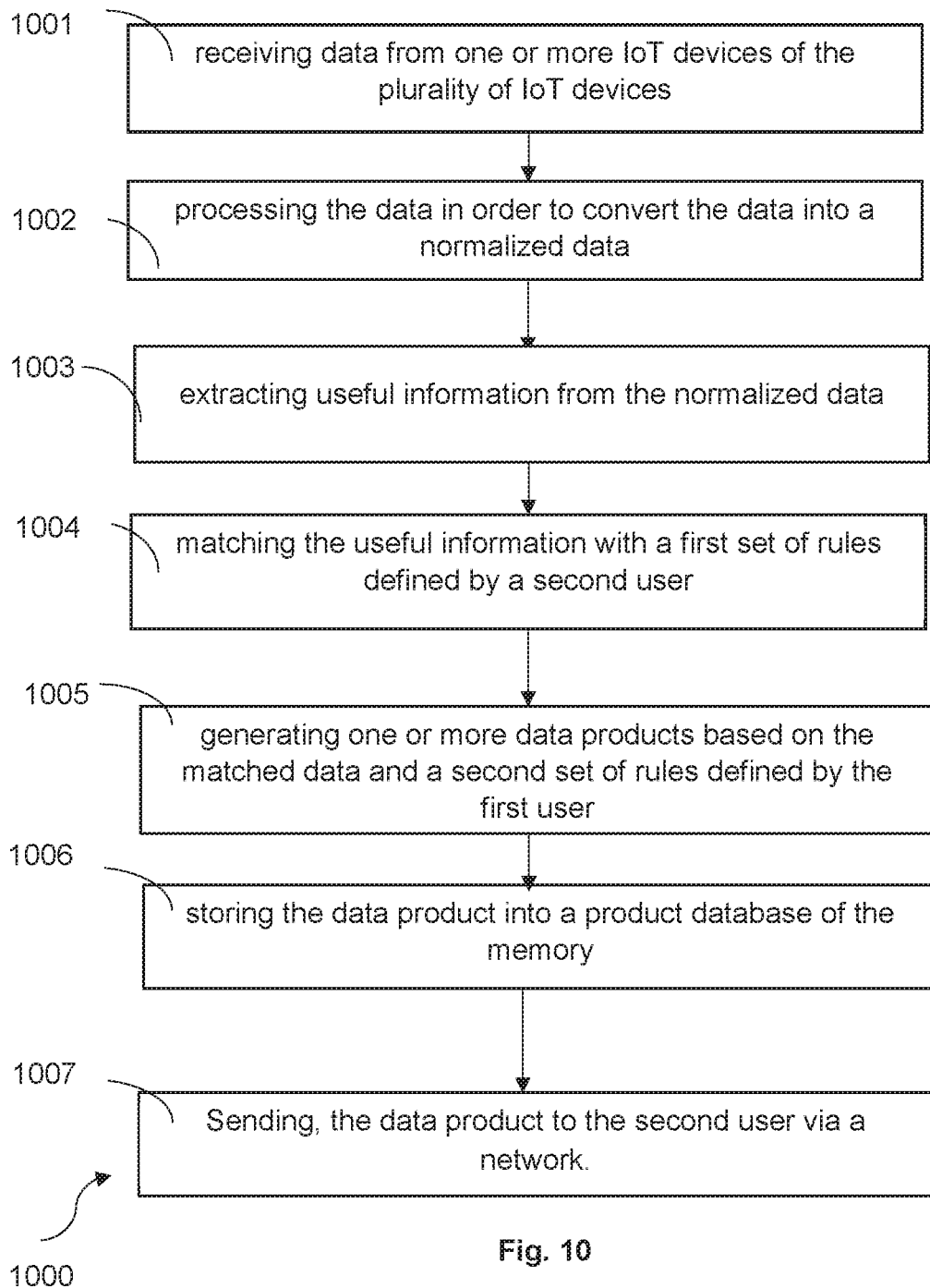
FIG. 10 illustrates a method 1000 facilitating data exchange amongst communication devices connected via one or more communication networks, in accordance with an embodiment of the present subject matter.

Now, referring to FIG. 10, a method 1000 for facilitating data exchange amongst communication devices connected via one or more communication networks, in accordance with the embodiment of the present subject matter is illustrated. At step 1001, the processor 201 may receive the data from one or more IoT devices of the plurality of IoT devices. In one embodiment, the data may be associated with a first user. The data may be received using at least one communication protocol.

At block 1002, the processor 201 may be configured to process the data in order to convert the data into the normalized data. The normalized data comprises the data in various formats.

At block 1003, the processor 201 may be configured to extract the useful information from the normalized data. In one embodiment, the useful information may be extracted using a predefined set of business logic and business rules. These business logics and the business rules may be enabled to determine how data are processed, who will need data, what type data to be sent to the right users/subscribers.

At block 1004, the processor 201 may be configured to match the useful information with the first set of rules defined by the second user.

At block 1005, the processor 201 may be configured to generate one or more data products based on the matched data and a second set of rules defined by the first user.

At block 1006, the processor 201 may be configured to store the one or more data products into a product database of the memory.

At block 1007, the processor 202 may be configured to send the one or more data products to the second user via the network.

Although implementations for method and system for facilitating data exchange amongst communication devices connected via one or more communication networks have been described in language specific to structural features and/or methods, it is to be understood that the appended claims are not necessarily limited to the specific features or methods described. Rather, the specific features and methods are disclosed as examples of implementations for facilitating data exchange amongst communication devices connected via one or more communication networks.

What is claimed is:

1. A system for facilitating data exchange amongst communication devices connected via one or more communication networks, the system comprising:
    a plurality of Internet of Things (IoT) devices;
    a processor communicatively coupled with the plurality of IoT devices; and
    a memory coupled with the processor, wherein the processor is configured to execute programmed instructions stored in the memory for
    receiving data from one or more IoT devices of the plurality of IoT devices, wherein at least one IoT device of the plurality of IoT devices is classified into a class of a plurality of predefined classes based upon hardware configuration of the said at least one IoT device, wherein the data is associated with a first user, and wherein the data is received using at least one communication protocol;
    reducing delay of multiple hops between IoT devices and the processor, and wherein the delay of multiple hops between the IoT devices and the processor is calculated based upon parameters comprising a transmission radius (r), a channel access probability (p), a node density ($\Lambda$) and a percentage of silent relay nodes ($\alpha$), and wherein allocation of the processor to process the data received from at least one IoT device of the plurality of the IoT devices and the data received from the first user and second user is based on the delay of multiple hops;
    processing the data in order to convert data into a normalized data, wherein the normalized data comprises data in various formats;
    extracting information from the normalized data, wherein the information is extracted using a set of predefined business logic and business rules;
    matching the information with a first set of rules defined by a second user to obtain matched data, wherein the first set of rules defined by the second user are received by the system through XMPP protocol, and wherein the first set of rules comprises one or more rules configured to define data delivery network channel interfaces, select a data product, a payment method and complete transaction of the data product;
    generating one or more data products based on the matched data and a second set of rules defined by the first user, wherein the second set of rules defined by the first user are received by the system through XMPP protocol, and wherein the second set of rules comprises one or more rules configured to categorize the data, define data delivery methods, define product catalogue, define product price schedule, define product copyright terms, and finally publish the product on data;
    storing the one or more data products into a product database of the memory; and
    sending the one or more data products to the second user via a network.

2. The system of claim 1, wherein the plurality of IoT devices are either internet capable or non-internet capable IoT devices.

3. The system of claim 1, wherein the IoT devices are communicatively coupled with the processor through one of communication means selected from a group consisting of a barcode scanner, powerline, Ethernet, RFID, ANT, NFC, 6LoWPAN, ZIGBEE, Z-WAVE, UWB, Bluetooth, Wi-Fi, DASH7, License-free spectrum radio, WiMAX, Weightless, 2G/GSM/EDGE CDMA, EVDO, 1 G, GPS/GPRS, and Cellular 4G/LTE.

4. The system of claim 1, wherein the first user is an owner of the data and the second user is a subscriber of the data.

5. The system of claim 4 further comprising a first user interface configured to enable the owner to define the second set of rules.

6. The system of claim 4 further comprising a second user interface configured to enable the subscriber to define the first set of rules.

7. The system of claim 1, wherein the data is received from the plurality of the IoT devices using a plurality of communication protocol selected from a group consisting of IPv4, IPv6, UDP, DTLS, RPL, Telnet, MQTT, DDS, CoAP, XMPP, HTTP, Sockets, and REST APIs.

8. The system of claim 1, wherein the delay of multiple hops between the IoT devices and the processor is calculated using a mathematical equation, $$E[d_c] = \frac{e^{-\Lambda \eta f2}}{p} [e^{(\Lambda \pi f2/1 - p\Lambda D/r)} - 1]$$

$$F = (1 + \Delta)r.$$

9. A method for facilitating data exchange amongst communication devices connected via one or more communication networks, the method comprising:
  receiving, via a processor, data from one or more IoT devices of the plurality of IoT devices, wherein at least one IoT device of the plurality of IoT devices is classified into a class of a plurality of predefined classes based upon hardware configuration of the said at least one IoT device, wherein the data is associated with a first user, and wherein the data is received using at least one communication protocol;
  reducing, via the processor, a delay of multiple hops between IoT devices and the processor, and wherein the delay of multiple hops between the IoT devices and the processor is calculated based upon parameters comprising a transmission radius (r), a channel access probability (p), a node density ($\Lambda$) and a percentage of silent relay nodes ($\alpha$), and wherein allocation of processor to process the data received from at least one IoT device of the plurality of the IoT devices and data received from the first user and second user is based on the delay of multiple hops;
  processing, via the processor, the data in order to convert data into a normalized data, wherein the normalized data comprises data in various formats;
  extracting, via the processor, information from the normalized data, wherein the information is extracted using a set of predefined business logic and business rules;
  matching, via the processor, the information with a first set of rules defined by a second user to obtain matched data, wherein the first set of rules defined by the second user are received by the system through XMPP protocol, and wherein the first set of rules comprises one or more rules configured to define data delivery network channel interfaces, select a data product, a payment method and complete transaction of the data product;
  generating, via the processor, one or more data products based on the matched data and a second set of rules defined by the first user, wherein the second set of rules defined by the first user are received by the system through XMPP protocol, and wherein the second set of rules comprises one or more rules configured to categorize the data, define data delivery methods, define product catalogue, define product price schedule, define product copyright terms, and finally publish the product on data;
  storing, via the processor, the one or more data products into a product database of the memory; and
  sending, via the processor, the one or more data products to the second user via a network.

10. The method of claim 9, wherein the first user is the owner of the data and the second user is the subscriber of the data.

11. The method of claim 9, wherein the information is extracted using a set of predefined business logic and business rules.

12. The method of claim 9, wherein the delay of multiple hops between the IoT devices and the processor is calculated using a mathematical equation, $$E[d_c] = \frac{e^{-\Lambda \eta f2}}{p} [e^{(\Lambda \pi f2/1 - p\Lambda D/r)} - 1]$$

$$F = (1 + \Delta)r.$$

13. A non-transitory computer readable medium storing program for facilitating data exchange amongst communication devices connected via one or more communication networks, the program comprising programmed instructions for:
  receiving data from one or more IoT devices of the plurality of IoT devices, wherein at least one IoT device of the plurality of IoT devices is classified into a class of a plurality of predefined classes based upon hardware configuration of the said at least one IoT device, wherein the data is associated with a first user, and wherein the data is received using at least one communication protocol;
  reducing, via the processor, a delay of multiple hops between IoT devices and the processor, and wherein the delay of multiple hops between the IoT devices and the processor is calculated based upon parameters comprising a transmission radius (r), a channel access probability (p), a node density ($\Lambda$) and a percentage of silent relay nodes ($\alpha$), and wherein allocation of processor to process the data received from at least one IoT device of the plurality of the IoT devices and data received from the first user and second user is based on the delay of multiple hops;
  processing the data in order to convert data into a normalized data, wherein the normalized data comprises data in various formats;
  extracting information from the normalized data, wherein the information is extracted using a set of predefined business logic and business rules;
  matching the information with a first set of rules defined by a second user to obtain matched data, wherein the first set of rules defined by the second user are received by the system through XMPP protocol, and wherein the first set of rules comprises one or more rules configured to define data delivery network channel interfaces, select a data product, a payment method and complete transaction of the data product;
  generating one or more data products based on the matched data and a second set of rules defined by the first user, wherein the second set of rules defined by the first user are received by the system through XMPP protocol, and wherein the second set of rules comprises one or more rules configured to categorize the data, define data delivery methods, define product catalogue, define product price schedule, define product copyright terms, and finally publish the product on data;
  storing the one or more data products into a product database of the memory; and
  sending the one or more data products to the second user via a network.

* * * * *